United States Patent [19]
Fofonoff et al.

[11] Patent Number: 6,022,445
[45] Date of Patent: Feb. 8, 2000

[54] METHOD AND APPARATUS FOR REMOVAL OF BIOPOLYMER CONSTRUCTS FROM SUPPORT STRUCTURES

[75] Inventors: Timothy W. Fofonoff, Dedham; Eugene Bell, Boston, both of Mass.

[73] Assignee: Tissue Engineering, Inc., Boston, Mass.

[21] Appl. No.: 08/851,626

[22] Filed: May 6, 1997

[51] Int. Cl.[7] .................................................. B32B 35/00
[52] U.S. Cl. .......................... 156/344; 156/247; 156/584; 264/335; 264/565; 264/572; 264/573; 264/574
[58] Field of Search ................................... 156/344, 584, 156/247; 264/572, 573, 574, 565, 335

[56] References Cited

U.S. PATENT DOCUMENTS

| | | | |
|---|---|---|---|
| 2,628,387 | 2/1953 | Landau | 264/335 |
| 4,738,740 | 4/1988 | Pinchuk et al. | 156/167 |
| 5,000,814 | 3/1991 | Sumi | 156/344 |
| 5,129,810 | 7/1992 | Nakagaki | 425/422 |
| 5,496,432 | 3/1996 | Sumi et al. | 156/584 |

FOREIGN PATENT DOCUMENTS

| | | |
|---|---|---|
| 0 121 316 A1 | 10/1984 | European Pat. Off. . |
| 0 286 220 A1 | 10/1988 | European Pat. Off. . |
| 0 627 226 A1 | 12/1994 | European Pat. Off. . |
| 2090230 | 1/1972 | France . |
| 2653056 | 4/1991 | France . |
| 2 130 521 | 6/1984 | United Kingdom . |

*Primary Examiner*—Deborah Jones
*Assistant Examiner*—Robert R. Koehler
*Attorney, Agent, or Firm*—Lahive & Cockfield, LLP; Anthony A. Laurentano

[57] ABSTRACT

Method and apparatus are disclosed for removing biopolymer constructs from support structures used to impart a selected shape to the biopolymer. The biopolymer construct and the support structure are in intimate at an interface and adhere to each other. The support structure includes an endcap adapted for introducing a fluid to the interface for reducing adhesion between the biopolymer structure and the support structure by applying a separating force at the interface, thereby facilitating removal between the support structure and the biopolymer construct.

45 Claims, 5 Drawing Sheets

METHOD AND APPARATUS FOR REMOVAL OF BIOPOLYMER CONSTRUCTS FROM SUPPORT STRUCTURES

FIELD OF THE INVENTION

This invention relates to the fabrication of biopolymer constructs suitable for use in vitro or in vivo, and more particularly, to methods and apparatus for removing biopolymer constructs from support elements used to impart a shape to the construct.

BACKGROUND

A biopolymer is a polymer suitable for introduction into a living organism, e.g., a human. The biopolymer is usually non-toxic and bioabsorbable when introduced into the living organism, and any degradation products of the biopolymer are also non-toxic to the organism. The biopolymer can be formed into biocompatible constructs that include, for example, biopolymer foams, e.g., single or double density foams, and/or biopolymer fibers. The construct can also include extracellular matrix particulates.

Biopolymers, such as sponges or foams are very useful in vitro to provide model systems for research, or in vivo as hemostatic agents, scaffolds or as prostheses and implants to replace damaged or diseased tissues. In both in vivo and in vitro applications, the foams can be seeded with various cell types, allowing in vitro study of cell functions in three dimensions, and promoting in vivo remodeling and integration of the implant or prosthesis. Often a biopolymer construct that includes a biopolymer foam is prepared in vitro, such as by seeding the foam with cells and culturing the growth and differentiation of these cells, prior to use in vivo.

Many different foam-based constructs are possible, and often it is desirable that the shape of a foam construct resemble the organ or tissue the foam is to model or replace. To create a foam construct of a desired shape, a biopolymer solution can be cast about a support member and the solution freeze-dried to form a foam that has the shape of the mold and/or support member. For example, to model or replace a blood vessel, a tubular biopolymer foam construct can be created by placing the foam solution into a mold that includes a central support. The foam solution is then freeze-dried to have the desired shape. The foam is often further processed to increase the density of the foam. Unfortunately, the resultant biopolymer construct often strongly adheres to the support. Pulling, tugging or twisting the foam to remove it from the mandrel often damages the foam, rendering it less useful, or even totally useless, for in vivo or in vitro use.

Similar considerations apply to the removal of biopolymer constructs that are formed by winding, braiding or otherwise forming biopolymer fibers about a support structure.

Accordingly, there exists a need in the art for improved methods and apparatus for removing biopolymer constructs from support or shaping members. In particular, an object of the invention is to provide methods and apparatus that aid or assist the removal of the biopolymer material from the support.

The invention will next be described in connection with certain preferred embodiments. However, it should be clear that various changes and modifications can be made by those skilled in the art without departing from the spirit and scope of the invention. For example, various methods and systems employing various system structural components that utilize the preferred practice of the invention can be employed to facilitate removal or separation of a biopolymer construct from the support about which it is cast.

SUMMARY OF THE INVENTION

The present invention attains the foregoing and other objects by providing methods and apparatus to remove biopolymer constructs from a support, typically initially used to shape or support the biopolymer construct, and to which the construct often adheres.

Note that the term "biopolymer construct," as used herein, refers to a biopolymer structure that includes a biopolymer, such as a biopolymer foam or biopolymer fibers. The term is also intended to include composite structures that have, for example, both biopolymer fibers and foams. Other material, such as extracellular matrix materials, may also be present. The biopolymer construct is typically intended for use as a prosthesis or implant.

Typical biopolymers useful in accordance with the teachings of the present invention are non-toxic polymers, and are suitable for introduction into a living organism. Examples of biopolymers include collagen, alginic acid, polyvinyl alcohol, proteins such as chondroitin sulfate, elastin, laminin, heparan sulfate, fibronectin and fibrinogen. A combination or mixture of one or more biopolymers can be used to form biopolymer constructs, according to the present invention. Collagen is the biopolymer preferably used to form biopolymer constructs, as collagen foams and fibers have a relatively low immunogenicity and consist of a naturally occurring structural protein to which cells can attach, interact with and degrade. For example, in vivo, collagen foam constructs are bioabsorbable.

As used herein, the term "biopolymer foam" refers to a network of communicating microcompartments having biopolymer molecules and/or biopolymer filaments interspersed within the walls of the microcompartments. The biopolymer foams can be single density or double density foams. Double density foams have microcompartments that are smaller in volume, typically by a factor of approximately two to ten, than single density foams. Biopolymer foam constructs of a desired shape can be formed by freeze-drying, and by techniques elaborated upon infra, such as employing a biopolymer solution that has been cast into a mold. The mold can contain support or shaping structures for supporting and/or imparting a given shape to the resulting foam structure.

According to aspects of the invention, the biopolymer construct can be formed about a support or shaping structure, such that the construct and support structure are placed in intimate contact at an interface therebetween. For example, when forming a blood vessel, the biopolymer construct can be formed by casting a foam about a central mounting element such that the resulting biopolymer foam construct has an internal bore, or lumen, having an inner, or luminal, surface. The central mounting element is inside the lumen such that the outer surface of the central element and the inner surface of the bore form an interface where the mounting element and the biopolymer construct are in intimate contact and strongly adhere to each other. While the outer portion of the mold can be removed without undue difficulty, the small diameter of the lumen can make removing the central mounting element difficult.

According to one aspect, the invention includes a support structure configured for mounting a biopolymer construct such that the biopolymer construct and the support are placed in intimate contact, and form an interface therebetween, when the biopolymer construct is mounted about the support. In addition, a separating force can be applied to the interface to separate the biopolymer construct from the support structure to facilitate removal of either the foam or support structures.

According to another aspect of the invention, the support structure includes at least one endcap element and a removable and replaceable mounting element that is attached or mounted to one end of the endcap. The support structure has an outer surface adapted for mounting the biopolymer construct. The mounting element can be, for example, a mandrel.

According to still another aspect of the invention, a sealing element is in sealing engagement with one of the endcap element and the biopolymer construct for forming a fluid seal therebetween. A second seal can also be included, axially spaced from the first seal, for sealing the biopolymer construct to the mounting element.

In yet a further aspect of the invention, the support structure includes a support platen connected to the endcap element for supporting the endcap element and the mounting element at a selected vertical height.

According to one feature of the invention, the endcap has a fluid passageway formed therein, where the fluid passageway is adapted for conveying a fluid to the interface to apply a force thereto to facilitate separation of the biopolymer construct from the mounting element. Typically, pressure applied by the fluid radially expands the biopolymer construct away from the elongated mounting element. This applied separation force breaks or reduces the adhesion of the biopolymer construct to the support, e.g., mounting element.

According to another feature of the invention, the mounting element includes a fluid manifold extending along a longitudinal axis thereof. The manifold includes a plurality of fluid passageways that extend between a central fluid carrying bore and the outer surface of the element. The fluid manifold, and thus the bore and passageways, are adapted for delivering a fluid to the interface to apply a separating force thereto sufficient to separate the biopolymer construct from the mounting element.

According to yet a further feature of the invention, a confining sleeve is adapted for mounting about an outer surface of the biopolymer construct to confine or inhibit expansion of the biopolymer construct when the separating force is applied to the interface. The confining sleeve can be porous to allow fluid leaking through the biopolymer to escape from between the biopolymer construct and the confining sleeve.

According to one aspect, the invention includes a fluid source for supplying a fluid to the endcap and the fluid manifold, if present. Furthermore, the endcap has a fluid aperture formed therein, which is in fluid communication with the fluid manifold for applying, in conjunction with the fluid network, a fluid to the interface.

According to another aspect of the invention, the endcap and the biopolymer construct form a connection joint when mounted together, and a sealing element sealingly engages the connection joint to form a fluid seal thereat. A second sealing element can be disposed at an end of the mounting element opposite the connection joint to form a fluid seal between the biopolymer construct and the mounting element.

The present invention further provides for a support structure that is configured for mounting a biopolymer construct. The biopolymer construct and the support structure when placed in intimate contact form an interface therebetween. The invention further provides structure for reducing the adhesion between the biopolymer construct and the support member when assembled.

According to one practice of the invention, the structure for reducing the adhesion between the support member and the biopolymer construct includes an element for supplying a fluid to one of the biopolymer construct and the support structure to reduce the adhesion therebetween.

According to one aspect of the invention, the biopolymer construct has a bore therethrough and the support structure is disposed within the bore. In addition, the support structure can include a mounting element and a flange, e.g., an endcap, mounted to one end thereof. The flange can include a fluid passageway that is in fluid communication with the biopolymer construct when the biopolymer construct is mounted about the mounting element. A fluid supply for supplying fluid pressure to the fluid passageway can also be included.

According to another aspect of the invention, the mounting element includes a fluid network having a fluid manifold and transverse or orthogonal fluid outlets that are in fluid communication with a luminal surface, or backside, of the foam construct when mounted about the mounting element, such that fluid pressure can be applied to the interface through the fluid network. First and second sealing elements can also be included, the first sealing element for forming a seal between the fluid passageway and the biopolymer construct, and the second sealing element for forming a seal between the mounting element and the biopolymer construct.

The fluid source and flange can form an integral structure, such as to resemble a syringe, or the fluid source can be separate such that the fluid can be supplied to the end cap or flange by suitable fluid conduits.

The fluid is preferably a fluid that does not adversely affect the biopolymer construct and the support member, and that can be applied to the interface so as to reduce adhesion between the biopolymer construct and the support element, such as by exerting a separating force at the interface. Fluids suitable for use with the present invention include liquids and gases. Some leakage of fluid past the sealing elements, as well as through the biopolymer construct itself, is acceptable.

The present invention also encompasses methods for separating support members from biopolymer constructs, as set forth in the disclosure below.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, may show in some figures relative dimensions.

DESCRIPTION OF ILLUSTRATED EMBODIMENTS

Figure 1:
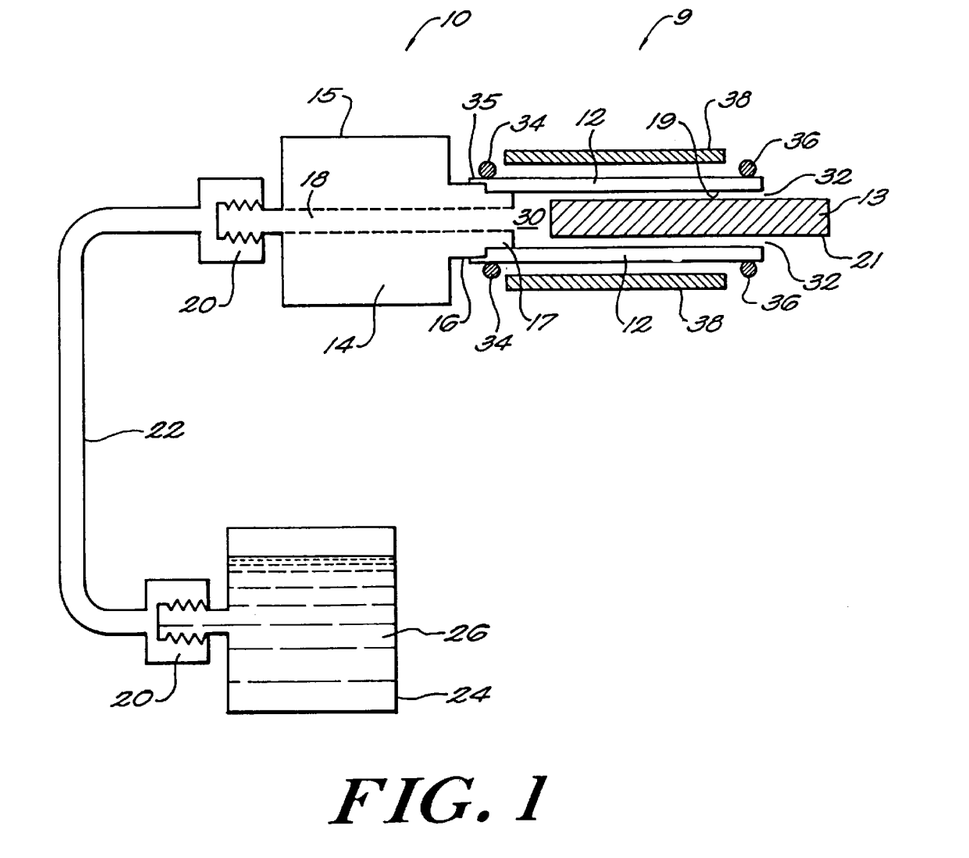
FIG. 1 is a schematic view, partly in cross-section, of a system in accordance with the present invention for facilitating separation or removal of a biopolymer construct from a support element.

FIG. 1 illustrates a system 9 for facilitating the formation of a biopolymer construct 12, and for facilitating the removal of the biopolymer construct 12 from a support. The illustrated system 9 includes a cylindrical biopolymer construct 12 that is mounted about a support structure 10. The support structure 10 includes a removable and replaceable elongated mounting element 13, such as a mandrel, and an end cap 14. The end cap 14 can include a first section 15, having a first selected diameter, and second and third sections, 16 and 17 respectively, having second and third selected diameters, respectively. Typically, the third selected diameter is less than the second selected diameter, which is in turn less than the first selected diameter.

The biopolymer construct 12 can be formed by casting a biopolymer solution about the central support member 13 and at least the third end cap section 17, as shown in FIG. 1. The cylindrical biopolymer construct 12 has a lumen 30, into which the third end cap section 17 projects. The end cap 14 includes an internal fluid passage way 18 that is in fluid communication with lumen 30, and, via connectors 20 and tube 22, with fluid supply 24. Fluid supply 24 includes a fluid, such as a hydraulic fluid 26, that is compatible with the biopolymer construct. Suitable fluids include water, saline solution, nitrogen gas, air, and other fluids appreciated by those of ordinary skill in the art, in light of the disclosure herein, to be appropriate.

Techniques for casting the biopolymer foam tube 12 are described in U.S. patent application Ser. No. 08/754,818, filed on Nov. 21, 1996, herein incorporated by reference. The mandrel 13 is thus mounted to the end cap 14 by the biopolymer construct 12, which is in intimate contact with both the mandrel 13 and the end cap 14. In particular, the inner surface 19 of the biopolymer construct 12 is in intimate contact with an outer surface 21 of the elongated mounting element 13 such that an interface 32 is formed therebetween. For purposes of illustration, the interface 32 and the portion of lumen 30 between an end of the mandrel 13 and the third section 17 of the end cap 14 are enlarged.

Fluid supply 24 provides fluid under pressure such that the fluid enters the lumen 30 and penetrates to the interface 32 to reduce adhesion between the elongated mounting element 13 and the biopolymer construct 12. The fluid 26 may reduce the adhesion in several ways, including penetrating the interface 32 so as to act as a penetrating fluid that affects the bonding between the mandrel outer surface 21 and the inner, or luminal, surface 19 of the biopolymer construct 12; providing lubrication such that the mandrel may be more readily pulled from the biopolymer construct 12; and providing a separating force to radially expand the biopolymer construct 12 away from the mounting element 13.

First and second seals 34 and 36, respectively, limit fluid leakage of the fluid 26 from the lumen 30. The seal 34 seals the connection joint 35 between the biopolymer construct 12, the second and third endcap sections, 16 and 17, respectively, and an end of mandrel 13. Seal 36 is spaced along the biopolymer construct 12 from seal 34 and tends to seal the biopolymer construct 12 to the central mounting element 13. The seals 34 and 36 allow the fluid source 24 to maintain an adequate pressure of fluid 26 at the interface 32 to reduce adhesion between the central mounting element 13 and the biopolymer construct 12. A confining sleeve 38 restrains expansion of the biopolymer construct 12 to limit damage thereto from the separating force provided by the fluid 26 under pressure in the lumen 30 and at the interface 32. The seals 34 and 36 are typically O-ring type seals and can be made of a material such as an elastomer. The seal 36 reduces leakage from the interface 32 and squeezes the biopolymer construct 12 only as tightly against the mandrel 13 as is necessary, so as to avoid unduly impeding removal of the central element 13. Removal of central element 13 is discussed below in conjunction with FIG. 4.

The confining sleeve 38 is preferably porous so as to allow any fluid 26 that leaks through the biopolymer construct 12 to escape from between the confining sleeve 38 and the construct 12. The confining sleeve 38, can, for example, be fabricated from wire mesh.

Figure 2:
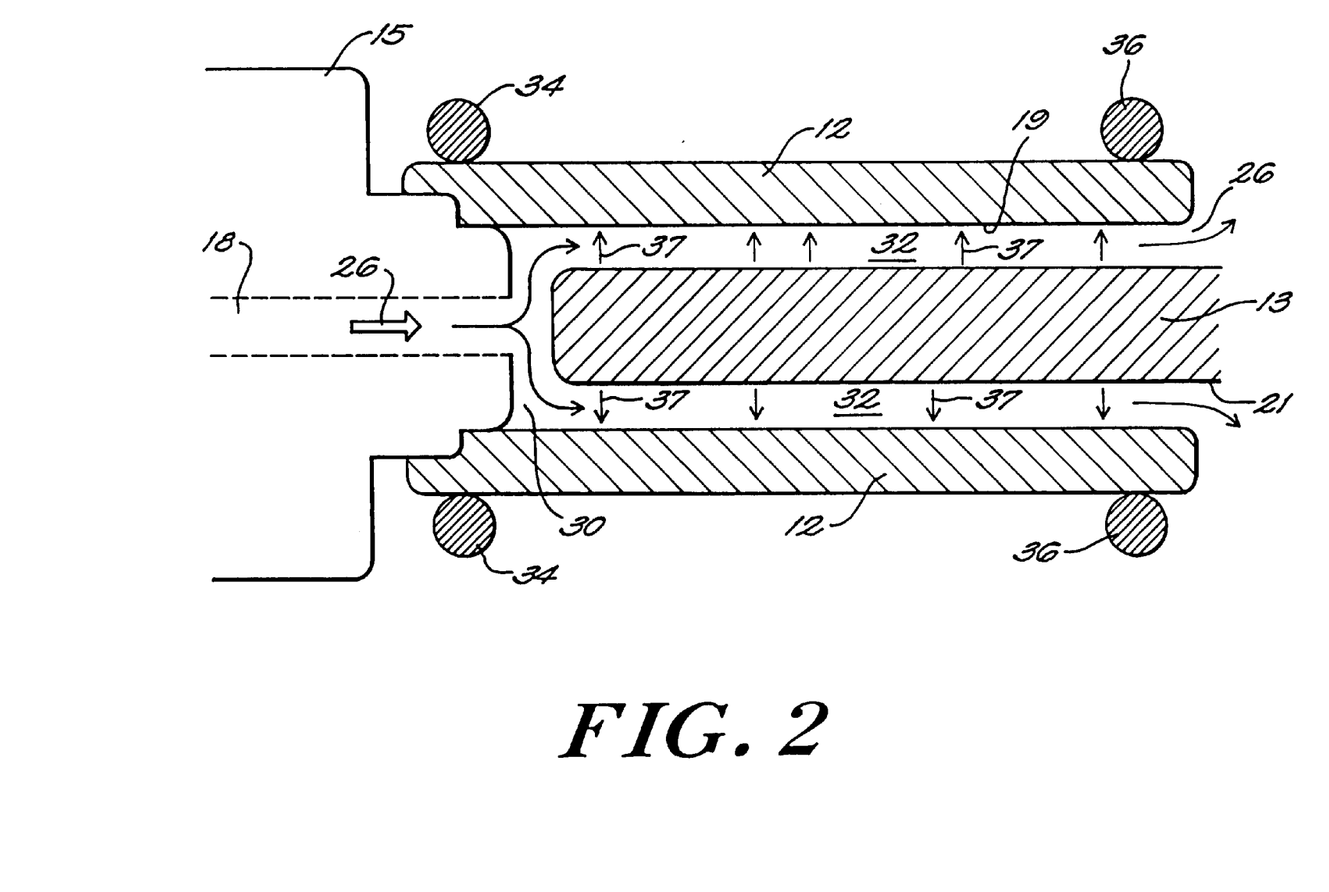
FIG. 2 is a cross-sectional view of the support of the system of FIG. 1 illustrating according to one embodiment the application of a separating force to an interface between the support 14 and the biopolymer construct.

FIG. 2 illustrates the application of a separating force 37, indicated by arrows, to the biopolymer construct 12 by the provision of the fluid 26 into the interface 32 and lumen 30. The separating force 37 acts to radially expand the biopolymer construct 12 away from the central support element 13. Some leakage of the fluid 26 can occur past the seals 34 and 36.

Figure 3:
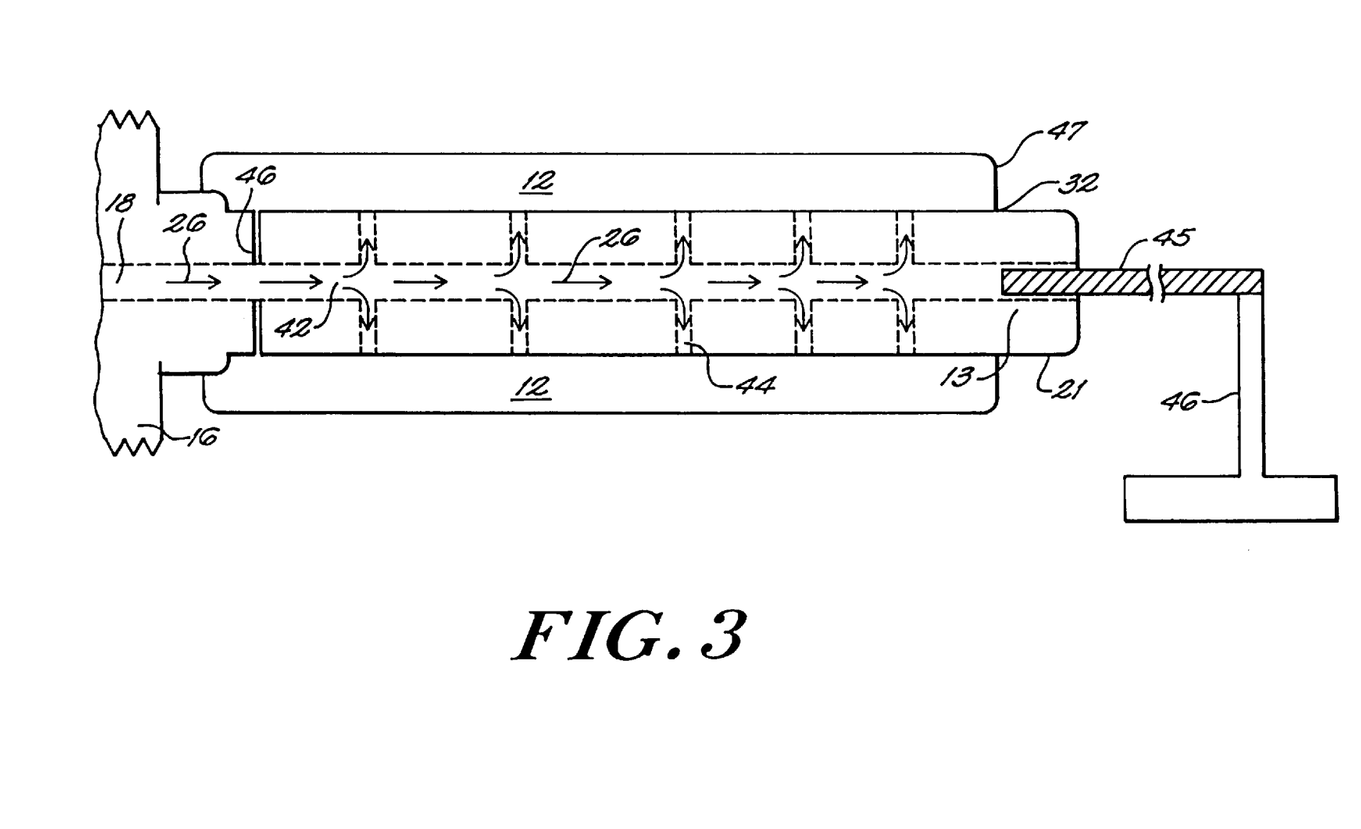
FIG. 3 is a cross-sectional view of the support element of FIG. 1, illustrating, according to another embodiment, the application of a separation force through an network fluid to the interface between the biopolymer construct and the support element.

FIG. 3 illustrates a provision of a fluid manifold 42 that includes a network of passages 44 in mandrel 13 to facilitate the delivery of fluid 26 to the interface 32, and therefore, the provision of a separating force 37 (not shown in FIG. 4) to the interface 32. The fluid manifold 42 includes orthogonal passages 44. As illustrated, the fluid 26 in the internal passageway 18 enters the fluid manifold 42 and is conveyed to the interface 32 by transverse fluid passages 44. This facilitates the reduction of adhesion between the central support member 13 and the biopolymer construct 12.

A plunger guide rod 45 is provided for supporting the mandrel 13 as it separates from the biopolymer construct 12. The plunger guide rod 45 is adapted for insertion inside the fluid manifold 42 and is positioned such that as the mandrel 13 separates from the biopolymer construct 12, the plunger guide rod 45 restricts the flow of fluid 26 into those orthogonal passages 44 that have passed the far edge 47 of the construct 12, thereby limiting leakage of fluid 26. The plunger guide rod 45 is affixed to support 46.

Figure 4:
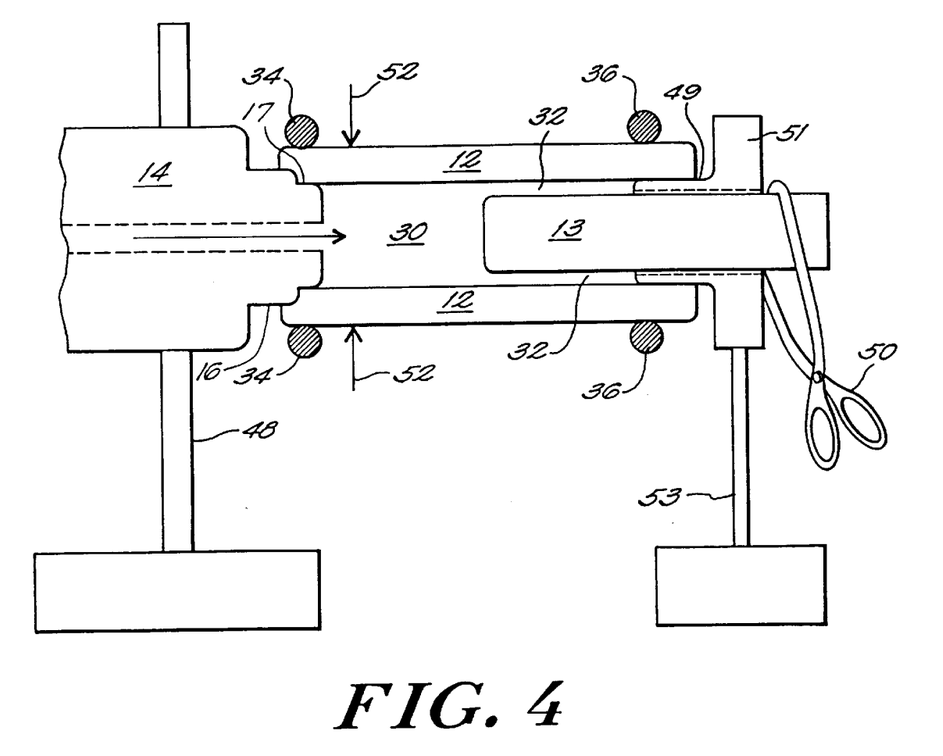
FIG. 4 is a perspective view illustrating removal of the biopolymer construct from the support structure of FIG. 1.

FIG. 4 illustrates removal of the support structure, including central support element 13 and end cap 14 from the biopolymer construct 12. Once the adhesion between the biopolymer construct 12 and the mandrel 13 has been reduced, the mandrel 13 maybe removed by tugging gently with an implement 50, e.g., a pair of tweezers or small pliers. Support platen 48 is mounted to end cap 14 to securely fix end cap 14 such that mandrel 13 may be removed from biopolymer construct 12. After the central support element 13 has been removed, the biopolymer construct 12 is typically cut from the end cap 14 along arrows 52 using a pair of snips or a knife (not shown).

The support structure 10 can include a second end cap 51, which can be secured to a second support platen 53, for supporting the construct 12 and for reducing the axial load applied to the construct 12 when the mandrel 13 is removed with the aid of the implement 50. The second end cap 51 has a bore therethrough, through which the mandrel 13 can pass.

The biopolymer construct 12 can be cast about the end cap 15, the mandrel 13, and the neck portion 49 of the second end cap 51. The confining sleeve 38 (not shown in FIG. 4) can be of a "clamshell" design, i.e., hinged, such that it can be closed in place over the biopolymer construct 12 and between the endcaps 15 and 51.

Figure 5:
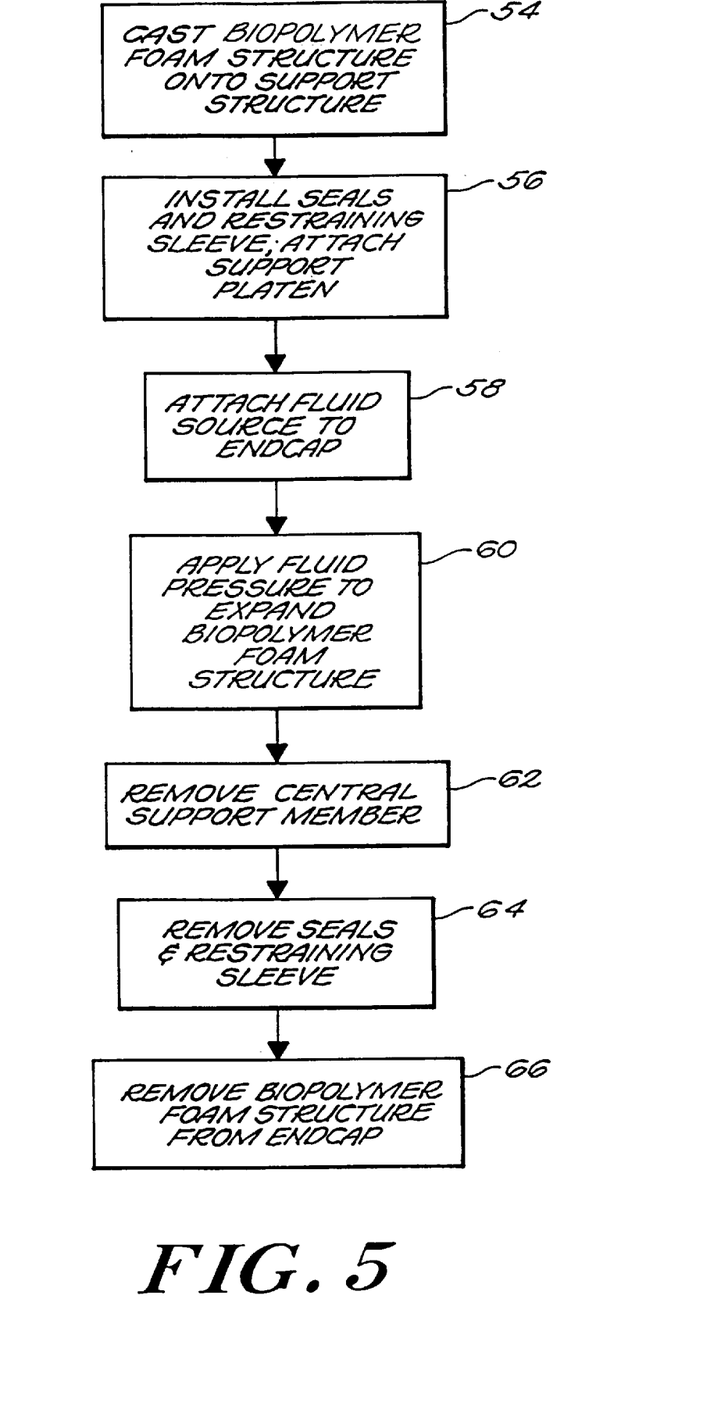
FIG. 5 is a schematic flow chart depiction of the steps for forming a biopolymer construct 12 about a support and removing the biopolymer construct 12 from the support 10.

FIG. 5 is a schematic flow chart illustrating the steps in fabricating a biopolymer construct 12, such as a foam structure, that is useful in in vivo or in vitro applications. To form the biopolymer construct 12, the first step 54 is to cast the construct 12 onto the support structure 10. Typically, the central support element 13 and the end cap 14 are placed in a mold and a biopolymer foam solution is delivered to the mold. The biopolymer solution is then freeze-dried to create a biopolymer construct 12. Creation of biopolymer foams from biopolymer foam solutions is described in U.S. patent application Ser. No. 08/754,818 incorporated by reference above. Note that the term "biopolymer construct," as used herein, is not limited to structures that contain only biopolymer foams, but encompasses structures formed of biopolymer fibers, and also composite structures that can include, for example, foam, fibers, and other materials, such as extracellular matrix particulates. Many such composite biopolymer constructs are possible, and are described in more detail in U.S. patent application Ser. No. 08/754,818, incorporated by reference above.

As indicated in block 56, the support structure 10 and biopolymer construct 12 adhering thereto are removed from the mold and seals 34 and 36 and restraining sleeve 38 installed. The end cap 14 is also attached to support platen 48. In block 58 the fluid source 24 is attached so to be in fluid communication with end cap 58. Next, as indicated in block 60, fluid pressure is applied to expand the biopolymer construct 12 and otherwise reduce adhesion between the biopolymer construct 12 and the mandrel 13. The next step, as indicated in block 62, is to remove the central support member 13, typically with an implement 50, such as a pair of tweezers, as illustrated in FIG. 4. Seals 34 and 36 and the restraining sleeve 38 are next removed from the biopolymer construct 12, as indicated in block 64. Finally, as indicated in block 66, the biopolymer construct 12 is removed from the end cap 14, typically by cutting with a sharp pair of shears or a knife. All of the steps described above, including casting the foam construct 12 onto the support structure 10, are preferably performed under sterile conditions. The biopolymer construct can now be further processed for use in vivo or in vitro.

Many materials are suitable for the mandrel, or central elongated member, 13, including stainless steel, Teflon or a ceramic. The diameter of the mandrel 13 typically ranges from about 0.3 mm to 22 mm. A preferred range is 1 mm to 3 mm.

The fluid communication tube 22 can be, for example, stainless steel tubing. The fluid source 24 can be a electric motor driven or hand driven pump and typically includes a reservoir for holding a reserve of hydraulic fluid 26. The fluid 26 can be a gas, and the fluid source 24 can be a gas regulator and a bottle of compressed gas 26. Pressures of the fluid 26 ranging to about 10 PSI often provide a suitable separating force 37. One of ordinary skill in the art, based on the teachings herein, can select other appropriate fluids 26 and fluid sources 24.

It is considered within the scope of the invention to cast the biopolymer construct 12 about the central support element 13, as opposed to casting the biopolymer construct 12 about both the central support element 13 and at least the third section 17 of the endcap 14, and subsequently forming the support structure 10 by inserting at least the third section 17 into the lumen 30 of the cylindrical biopolymer construct 12. The central support element 13 is then removed by the techniques described herein.

Although the preceding discussion describes casting a biopolymer construct 12 about the support structure 10, such as by freeze drying a biopolymer solution placed into mold that includes the support structure 10, one of ordinary skill in the art, in light of the disclosure herein, realizes that the invention is useful with biopolymer constructs that include biopolymer fibers. For example, a biopolymer construct 12 can be formed by spinning or weaving a biopolymer fiber or fabric of fibers about the support structure 10, including the mandrel 13, to form a tubular biopolymer construct 12. The present invention is intended to be useful in removing such a fiber biopolymer construct 12, or a composite construct including both fibers and foam, from a support structure 10.

It is understood that the above examples are illustrative and non-limiting and that many shapes of biopolymer constructs, in addition to tubes, can be cast about a support structure 10. The invention thus pertains to many shapes which a supporting or other member is to be separated from a biopolymer foam.

Fabrication of Biopolymer Foams

Many biopolymers can be formed into biocompatible foams, e.g., single or double density foams, composite foams, and biocompatible constructs which include biopolymer fibers, e.g., collagen fibers, biopolymer fabrics, e.g., collagen fabrics, and/or extracellular matrix particulates. As used herein, the term "foam" refers to a network of communicating microcompartments having biopolymer molecules and/or biopolymer filaments interspersed within the walls of the microcompartments. The biopolymer foams can be single density or double density foams. Double density foams have microcompartments that are smaller in volume, typically by a factor of approximately two to ten, than single density foams.

Examples of biopolymers which can be used to form a foam include collagen, alginic acid, polyvinyl alcohol, proteins, such as chondroitin sulfate, elastin, laminin, heparan sulfate, fibronectin and fibrinogen. A combination or mixture of one or more biopolymers can be used to form the biopolymer foams, and composite foams, i.e., combined single and double density foams, or combination of foams of different biopolymers, that can form the biopolymer constructs of the invention. For example, a combination of chondroitin sulfate and fibronectin can be used to form biopolymer fibers that can be incorporated with a biopolymer foam to form a biopolymer construct described herein. A preferred biopolymer is collagen.

The biopolymers foams, e.g., single or double density foams, can be formed into structures of any form or shape, e.g., strips, sheets, tubes, etc. Structures comprising biopolymer foams combined with polymer mesh, e.g., a Teflon mesh are possible. Biopolymer foams can be used with tissue culture inserts for multiwell plates which can be used as molds in which foams and biopolymer constructs of the invention can be formed for cell culture. Polymer meshes used with the foams and foam compositions of the invention can expose cells contained on and within the foams and foam compositions to the atmosphere as, for example, when the foams and foam compositions are used as skin equivalents to stimulate formation of a stratum corneum. Both the meshes and culture inserts have the advantage of providing a means for handling the foams and foam compositions without requiring actual contact with the foams or foam compositions. The shaped structures into which the foams and foam compositions are made can mimic those of tissues or body parts to be replaced and thus can be used as prostheses or grafts which tissue cells remodel to promote regeneration of a replacement tissue in the recipient. Extracellular matrix particulates and/or viable cells can also be added to the biopolymers to further promote cell in growth and tissue development and organization within the foams.

Biopolymer foams can be produced by forming a biopolymer solution, freeze-drying the solution to form a biopolymer foam, and crosslinking the biopolymer foam. Alternatively, the foam can be formed by performing the crosslinking step prior to the freeze-drying step. The step of freeze-drying converts the biopolymer solution into a foam, i.e., a network of communicating microcompartments with biopolymer molecules and/or filaments interspersed throughout its walls. When the foam is crosslinked, it becomes physically stable and insoluble in aqueous solutions. Preferably, the biopolymer solution is polymerized, prior to freeze-drying, to form a biopolymer lattice. As used herein, a biopolymer lattice refers to a network of biopolymer filaments in which fluid is trapped. Biopolymer filaments are nanometer-sized forms of polymerized biopolymer molecules. For example, if the biopolymer is collagen, the collagen polymerizes into nanometer sized filaments by a process of self-assembly.

The biopolymer solution can be formed by treating the biopolymer in such a manner that it becomes soluble, e.g., by manipulating its pH to put it into solution, can be polymerized using methods of polymerization known in the art. For example, the biopolymer, e.g., collagen, can be polymerized to form a biopolymer lattice by manipulation of the pH of the biopolymer solution, e.g., by exposure to ammonium vapor or by adding base. As the pH of the solution reaches neutrality, the biopolymer polymerizes. The rate of polymerization is proportional to temperature and can be controlled by regulating the temperature of the collagen solution.

After the biopolymer has been polymerized to form a biopolymer lattice, it is typically freeze-dried and/or crosslinked. Typically, the order of the these steps depends on the method of crosslinking used. For example, if the crosslinking method is a liquid phase method, e.g., the use of aldehydic crosslinking methods, the crosslinking step is performed prior to the freeze-drying step. Alternatively, if the crosslinking method is a solid phase method, e.g., use of ultraviolet radiation, the crosslinking step is performed after the freeze-drying step. Crosslinking of the biopolymer can be accomplished by use of crosslinking methods known in the art. For example, the biopolymer can be crosslinked by subjection to ultraviolet radiation or by treatment with chemical crosslinking agents such as carbodiimide, glutaraldehyde, acetaldehyde, formaldehyde, and ribose. The biopolymer can also be crosslinked by dehydrothermal crosslinking.

If desired, prior to freeze-drying, selected reinforcing material can be added to the biopolymer solutions. Such reinforcing materials include biopolymer fibers, threads, e.g., woven or braided threads, and/or fabrics, e.g., non-woven fabrics, prepared, for example, by textile methods. Biopolymer threads, e.g., collagen threads, can be prepared by extruding the biopolymer in solution into a coagulation bath and transferring the biopolymer to a bath containing ethanol or acetone or another dehydrating solution. Alternatively, the thread can be dehydrated by subjection to vacuum-drying. The biopolymer thread can then be crosslinked by, for example, methods described herein. An example of an apparatus for spinning and processing a biopolymer fiber, e.g., collagen fiber, is described in U.S. Ser. No. 08/333,414, filed Nov. 2, 1994, now U.S. Pat. No. 5,562,946, the contents of which are incorporated herein by references in their entirety. The threads can then be dried, spooled, for example, by pulling the moving thread over more rollers, stretching and drying it and then winding it onto spools. The threads can be woven or braided into fabric or other complex forms or constructs for use as described herein.

The term biopolymer fabrics is intended to include non-woven biopolymer fabrics, are typically composed of a mat of entangled biopolymer fibers of a selected size and density. Typically, the nonwoven biopolymer fabrics are produced by spooling dry biopolymer fiber onto a drum of circumference equal to that of the length of an individual fiber element. Spooling is continued until the number of wraps of fiber on the drum equals the number of pieces of fiber required for the fabric. A cut is then made across the wound fiber in a direction parallel to the drum axis and the fibers are removed from the drum. A textile machine, such as a staple length cutter can be used to cut the fibers to a selected length. The fiber can then be crosslinked if it has not been previously crosslinked. The fiber is then dispersed in a volume of a phosphate buffer solution for a period of time to decrease its pH and soften the fiber. The fiber is transferred to a volume of water and agitated mechanically to produce entanglement of the fiber strands. The entangled fiber strands are sieved from the water onto a collection screen until they coat the screen in a mat of uniform density. The mat is then dried on the screen or dried after transfer to another surface, screen, or cell culture device. If desired, the nonwoven mat can be cut or punched into smaller shapes after drying.

The biopolymer solution can then be freeze-dried to form a foam. The freezing step can be a controlled freezing step performed according to the method described in U.S. Pat. No. 4,531,373, the contents of which are incorporated herein by reference. The freeze-drying cycle typically includes freezing, evacuation, and drying phases. The freezing temperatures suitable for formation of the biopolymer foams of the invention depend upon the concentration of the biopolymer in solution or in the biopolymer lattice. Thus, for a collagen lattice in which the collagen is at a concentration of about 5 mg/ml the freezing temperature is typically less than −26° C. The collagen lattice is exposed to this temperature for a period of about 1 hour. A vacuum is then applied to the collagen lattice as the temperature is slowly raised.

To prevent the formation of fissures in the foam and thus to allow for greater foam size, an anti-freeze polypeptide (AFP) or an anti-freeze glycoprotein (AFGP) can be added to the biopolymer solution prior to or during the freezing step. Examples of AFPs include the AFPs which belong to the AFP Types I, II, and III. For a detailed description of the different types of AFPs, see, e.g., U.S. Pat. No. 5,358,931, PCT publication WO 92/12722, and PCT publication WO 91/10361, the contents of which are incorporated herein by reference. These polypeptides and glycoproteins prevent the formation of large ice crystals during freezing of the biopolymer solution and also prevent the formation of crystals of recrystallization during the drying process. Large ice crystals can create fissures in the resulting foam which contribute to poor crosslinking and splitting of the foam. Use of AFPs and AFGPs allow for the formation of a pore structure which has connected channels and thus allows for cohesion of the various sections of the foam. This feature improves the quality of the foams and enables the production of large foams. For example, when an AFP or combination of AFPs is freeze-dried with the biopolymer in high concentrations, e.g., about 0.2 to 0.5 mg/ml (about 124 $\mu$M), it dramatically reduces the normal foam pores until the foam resembles tightly packed long fibers. The foams produced using the AFPs in the freezing cycle can be employed, for example, as implants which direct specific cellular processes, e.g., through growth along the fibers.

After a single density foam is freeze-dried, it can be hydrated with, for example, a sterile aqueous buffer. If the hydrated single density foam is to be further shaped to have a selected form, e.g., it can be molded or formed in, on, or around a desired shape, e.g., it can be molded around a mandrel to form a tubular shape. Typically foams are then dried, e.g., air dried, at a temperature not greater than about 37° C.–40° C. under sterile conditions. At temperatures greater than about 37° C., the biopolymer in the foams will begin to denature, resulting in a double density foam that retains the fibers, walls, and two dimensional shape, but not the microcompartment sizes of the single density foams. The double density foam is stiff when dry and pliable when wet. It is resistant to tearing and to enzymatic digestion to a much greater extent that the single density foam. In contrast to the single density foam, the double density foam is a tight matrix which is preferred as a substrate for cells which normally grow on surfaces such as epithelial cells and endothelial cells. For example, the double density foam can be formed in the shape of a tube for use in reconstructing vessels or ducts or into a sheet and secured to large areas with sutures. Alternatively, the double density foam can be seeded with mesenchymal cells such as fibroblasts, muscle cells, chondrocytes, etc.

The resultant foam, whether single or double density, is removed, according to the invention, from support or shaping structures with which it is intimate contact and to which it typically adheres.

Fabrication of Collagen Fibers

As indicated above, a biopolymer construct 12 of the invention can be fabricated from biopolymer fibers. For example, a biopolymer fiber, a multi-fiber element, or a biopolymer fabric comprising fibers can be wound about the support structure 10, and removed from the support structure 10 using the methods and apparatus disclosed above. Methods and apparatus for fabricating biopolymer fibers are known to those of ordinary skill in the art as disclosed in U.S. Pat. No. 5,562,946, entitled "Apparatus and Method for Spinning and Processing Collagen Fiber," issued Oct. 8, 1996, and herein incorporated by reference.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. An apparatus for facilitating removal of an elongated biopolymer construct from a support, comprising a support structure configured for mounting the biopolymer construct, the biopolymer construct and said support structure being placed in intimate contact to form an interface therebetween when the biopolymer construct is mounted about said support structure, and fluid separation means for applying a pressurized fluid to form a fluid separating force to said interface to fluidly separate the biopolymer construct from said support structure to facilitate removal between the biopolymer construct and the support structure when assembled.

2. The apparatus of claim 1, wherein said support structure comprises an endcap element, and a removable and replaceable elongated mounting element mounted to one end of the endcap and having an outer surface adapted for mounting the biopolymer construct.

3. The apparatus of claim 2, further comprising a sealing element in sealing engagement with one of the biopolymer construct and said endcap for forming a fluid seal therebetween.

4. The apparatus of claim 2, wherein said support structure further comprises a support platen connected to another surface of said endcap for supporting said endcap and said mounting element at a selected vertical height.

5. The apparatus of claim 2, wherein said separation means comprises means forming a fluid passageway through said endcap, said fluid passageway being adapted for conveying a fluid to said interface to apply a force thereto to separate the biopolymer construct from said mounting element.

6. The apparatus of claim 2, wherein said mounting element includes means forming a fluid manifold therein extending along a longitudinal axis thereof, and means forming a plurality of fluid passageways that extend between said fluid manifold and said outer surface of said mounting element, said fluid passageways being adapted for delivering a fluid to said interface to apply a separating force thereto sufficient to separate the biopolymer construct from said mounting element.

7. The apparatus of claim 1, further comprising a confining sleeve adapted for mounting about an outer surface of the biopolymer construct when assembled with said support structure to confine expansion of the biopolymer construct when said separating means applies said separating force to said interface.

8. The apparatus of claim 2, wherein said mounting element comprises a fluid network formed therein, said fluid network including a fluid manifold formed within said mounting element and a plurality of fluid passages that communicate at least with one end with said fluid manifold and open onto said mounting element outer surface, said fluid network being adapted for transferring a fluid to said interface.

9. The apparatus of claim 8, further comprising a fluid source for supplying a fluid to said fluid network.

10. The apparatus of claim 8, wherein said endcap comprises a fluid aperture formed therein, said fluid aperture being disposed in fluid communication with said fluid network for applying in conjunction with said fluid network a fluid to said interface.

11. The apparatus of claim 2, wherein said mounting element is a mandrel.

12. The apparatus of claim 3, wherein said endcap and the biopolymer construct form a connection joint when mounted together, and wherein said sealing element sealingly engages said connection joint to form a fluid seal thereat.

13. The apparatus of claim 12, further comprising a second sealing element disposed at an end of said mounting element opposite said connection joint to form a fluid seal between the biopolymer construct and said mounting element.

14. Apparatus for facilitating removal of a biopolymer construct, comprising
   a support structure configured for mounting the biopolymer construct, the biopolymer construct and said support structure being placed in intimate contact to form an interface therebetween when the biopolymer construct is mounted about said support structure, and
   means for applying a pressurized fluid to the interface for fluidly reducing the adhesion between the biopolymer construct and the support member to facilitate removal of the biopolymer construct from the support member.

15. The apparatus of claim 14, wherein said means for reducing the adhesion between the support structure and the biopolymer construct includes means for supplying a fluid to one of the biopolymer construct and said support structure to reduce the adhesion therebetween.

16. The apparatus of claim 14, further comprising restraining means mountable about the biopolymer construct for limiting expansion of the biopolymer construct.

17. The apparatus of claim 14, wherein the biopolymer construct has a bore therethrough and said support structure is disposed within said bore.

18. The apparatus of claim 14, wherein the support structure comprises a mounting element and a flange mounted to one end thereof.

19. The apparatus of claim 18, wherein said flange comprises means forming a fluid passageway that is in fluid communication with the biopolymer construct when mounted about said mounting element, and wherein said means for reducing adhesion includes means for applying a fluid pressure to said fluid passageway.

20. The apparatus of claim 18, wherein said mounting element comprises means forming a fluid network therein having a fluid manifold and transverse or orthogonal fluid outlets that are in fluid communication with a backside of the biopolymer construct when mounted about the mounting element, and wherein said means for reducing adhesion includes means for applying a fluid pressure to said fluid network.

21. The apparatus of claim 19, further comprising first sealing means for forming a fluid seal between said fluid passageway and the biopolymer construct.

22. The apparatus of claim 21, further comprising second sealing means for forming a fluid seal between said mounting element and the biopolymer construct.

23. An apparatus for facilitating removal of an elongated biopolymer construct, comprising
   a support structure adapted to mount the biopolymer construct, the biopolymer construct and said support structure being disposed in intimate contact to form an interface surface therebetween when the biopolymer construct is mounted about said support structure, and
   separation means for applying a separating force to said interface surface to separate the biopolymer construct from said support structure thereby facilitating removal between the construct and said support structure, said separation means including means forming a fluid passageway through said support structure for introducing a fluid to said interface surface.

24. The apparatus of claim 23, wherein said separation means further comprises means for supplying a pressurized fluid to said fluid passageway for introducing said pressurized fluid through the support structure to said interface.

25. The apparatus of claim 23, further comprising fluid manifold means disposed in said support structure for distributing the fluid to said interface for separating the biopolymer construct from said support structure.

26. The apparatus of claim 23, further comprising a confining sleeve adapted for mounting about an outer surface of the biopolymer construct to confine expansion of the biopolymer construct when said separating means applies said separating force.

27. The apparatus of claim 23, further comprising sealing means for forming a fluid seal between said support structure and the biopolymer construct.

28. An apparatus for facilitating removal of an elongated biopolymer construct, comprising
   a support structure including an endcap and a mandrel connected to one end of said endcap, said mandrel being adapted to mount the biopolymer construct such that the construct and said support structure form an interface therebetween when the biopolymer construct is mounted about said support structure, and
   separation means for applying a pressurized fluid to form a separating force to said interface to separate the biopolymer construct from said support structure to facilitate removal between the construct and said support structure.

29. The apparatus of claim 28, wherein said mandrel comprises a fluid network formed therein, said fluid network including a fluid manifold formed within said mandrel and a plurality of fluid passages that communicate at one end with said fluid manifold and open onto said mandrel outer surface at an opposed end, said fluid network being adapted for transferring said pressurized fluid to said interface.

30. The apparatus of claim 28, further comprising a confining sleeve adapted for mounting about an outer surface of the biopolymer construct to confine expansion of the biopolymer construct when said separating means applies said separating force.

31. A method for removing a biopolymer construct from a support structure for shaping the biopolymer construct, comprising the steps of
   providing the biopolymer structure formed about at least a portion of an outer surface of the support structure, the biopolymer construct and the support structure forming an interface therebetween,
   applying a pressurized fluid to the interface to separate the biopolymer construct from the support structure, and
   removing one of the support structure and the biopolymer construct relative to the other.

32. The method of claim 31, wherein the step of providing comprises the step of casting a biopolymer construct about the outer surface of the support structure.

33. The method of claim 31, wherein the step of applying a separating force to the interface comprises the step of supplying said pressurized fluid to the interface to separate the biopolymer construct from the support structure.

34. The method of claim 31, wherein the step of applying comprises the step of expanding the biopolymer construct with said pressurized fluid to separate the support structure therefrom.

35. The method of claim 33, wherein the step of providing comprises the step of providing the biopolymer construct formed about a support structure including an endcap having a fluid passageway formed therein and a removable and replaceable elongated mounting element having an outer surface for mounting the biopolymer construct, and wherein said step of supplying the fluid to the interface includes the further step of supplying the pressurized fluid through the fluid passageway formed in the support structure.

36. The method of claim 35, further comprising the step of providing a first sealing element to form a seal between the biopolymer construct and the endcap.

37. The method of claim 36, further providing the step of providing a second sealing element to form a seal between the biopolymer construct and the elongated mounting element.

38. The method of claim 35, further comprising the steps of
forming a fluid manifold extending along a longitudinal axis of the elongated mounting element, and
forming a plurality of fluid passageways that extend between the fluid manifold and the outer surface, the fluid manifold and the fluid passageways being adapted for delivering the fluid to the interface.

39. The method of claim 31, further comprising including the step of disposing a restraining sleeve about the biopolymer construct for limiting the expansion of the structure in response to the separating force.

40. The method of claim 35, wherein the step of removing the support structure includes moving the elongated mounting structure from the biopolymer construct.

41. A method for separating a biopolymer construct from a support, comprising the steps of
providing a support structure having an endcap element with a fluid passageway formed therein and a removable and replaceable elongated mounting element having an outer surface,
forming a biopolymer construct about the outer surface of the mounting element and about a portion of the endcap element, the biopolymer construct and the support structure being placed in intimate contact to form an interface therebetween,
delivering a pressurized fluid to the interface through the fluid passageway of the endcap for providing a separating force to at least a portion of the interface for separating the biopolymer construct from the support structure, and
removing one of the support structure and the biopolymer construct relative to the other.

42. The method of claim 41, further comprising the step of providing a first sealing element to form a seal between the biopolymer construct and the endcap.

43. The method of claim 42, further comprising the step of providing a second sealing element to form a seal between the biopolymer construct and the elongated mounting element.

44. The method of claim 41, further comprising the steps of
forming a fluid manifold within the mounting element, and
forming a plurality of fluid passageways that extend between the fluid manifold and the outer surface of the mounting element, the fluid passageways being adapted for delivering the pressurized fluid to the interface.

45. The method of claim 41, further comprising the step of disposing a restraining sleeve about the biopolymer construct for limiting the expansion of the construct in response to the separating force.

* * * * *